US011836940B2

(12) United States Patent
Tilley et al.

(10) Patent No.: US 11,836,940 B2
(45) Date of Patent: Dec. 5, 2023

(54) THREE-DIMENSIONAL SENSOR ACUITY RECOVERY ASSISTANCE

(71) Applicant: ZEBRA TECHNOLOGIES CORPORATION, Lincolnshire, IL (US)

(72) Inventors: Patrick B. Tilley, Coram, NY (US); Ronald Zancola, Phoenix, AZ (US); Aleksandar Rajak, Ottawa (CA); Kevin Kar Yin Chan, Woodbridge (CA); Peter Randall Daly, Poughkeepsie, NY (US); Sanjeewa Thimirachandra, Kotugoda (LK); Raghavendra Tenkasi Shankar, Holbrook, NY (US); Alexander Miller, Ottawa (CA); Scott R. Murchison, Kanata (CA); Eliran Noach, Plainview, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 330 days.

(21) Appl. No.: 16/901,868

(22) Filed: Jun. 15, 2020

(65) Prior Publication Data
US 2021/0390724 A1    Dec. 16, 2021

(51) Int. Cl.
*G06T 7/593*   (2017.01)
*H04N 13/239*  (2018.01)
*G06T 7/90*    (2017.01)

(52) U.S. Cl.
CPC ............ *G06T 7/593* (2017.01); *G06T 7/90* (2017.01); *H04N 13/239* (2018.05)

(58) Field of Classification Search
CPC . G06T 7/593; G06T 7/85; G06T 2207/10028; G06T 2207/10021; H04N 13/239; G01B 11/022; G01B 11/002; G01B 11/24
See application file for complete search history.

(56) References Cited

U.S. PATENT DOCUMENTS

| 5,988,862 | A  | * | 11/1999 | Kacyra ............... G01B 11/002 |
| | | | | 702/155 |
| 6,377,700 | B1 | * | 4/2002 | Mack .................. H04N 13/246 |
| | | | | 348/E13.016 |
| 8,756,085 | B1 | * | 6/2014 | Plummer ............... G06T 7/187 |
| | | | | 705/40 |
| 9,886,933 | B2 | * | 2/2018 | Li ............................ G06F 3/03 |
| 10,216,236 | B1 | * | 2/2019 | Ashwood ............... H04B 1/385 |
| 10,277,888 | B2 | * | 4/2019 | Campbell ............ H04N 5/2253 |
| 10,708,491 | B2 | * | 7/2020 | Ilic ..................... H04N 5/23251 |
| 10,820,307 | B2 | * | 10/2020 | Zhang ................... H04W 72/14 |

(Continued)

*Primary Examiner* — Brian P Yenke

(57) ABSTRACT

A computing device includes: a three-dimensional (3D) sensor configured to capture point cloud data from a field of view (FOV); an auxiliary sensor configured to capture reference depth measurements corresponding to a surface within the FOV; a controller connected with the 3D sensor and the auxiliary sensor, the controller configured to: detect a reference depth capture condition; when the reference depth capture condition satisfies a quality criterion, control the auxiliary sensor to capture a reference depth corresponding to the surface within the FOV; and initiate, based on the captured reference depth, generation of corrective data for use at the 3D sensor to capture the point cloud data.

21 Claims, 7 Drawing Sheets

(56) References Cited

U.S. PATENT DOCUMENTS

| | | |
|---|---|---|
| 10,965,929 B1* | 3/2021 | Bellows .............. H04N 13/122 |
| 10,977,813 B2* | 4/2021 | Trajkovic .............. G06T 7/521 |
| 11,015,917 B2* | 5/2021 | Thimirachandra .... G01B 11/03 |
| 11,062,472 B1* | 7/2021 | Swope ...................... G06T 7/80 |
| 11,151,341 B2* | 10/2021 | Anchan ............. G06K 7/10554 |
| 11,182,572 B2* | 11/2021 | Gururaja ........... G06K 7/10861 |
| 11,195,328 B2* | 12/2021 | Sharp .................. G06Q 50/165 |
| 11,263,804 B1* | 3/2022 | Bogacz ..................... G06T 7/70 |
| 11,263,823 B2* | 3/2022 | Gausebeck ............. G06T 7/579 |
| 11,265,455 B1* | 3/2022 | Kuchenbrod .... H04N 5/232125 |
| 11,282,291 B1* | 3/2022 | Boardman ............ G06T 1/0007 |
| 11,302,025 B2* | 4/2022 | Thrimawithana ... G06F 3/04842 |
| 11,348,273 B2* | 5/2022 | Swope ................... G06F 9/542 |
| 11,361,420 B2* | 6/2022 | Chen ................... G06T 3/4023 |
| 11,430,104 B2* | 8/2022 | Barish .................. G06T 7/0004 |
| 11,443,449 B2* | 9/2022 | Krishnamurthy ......... G06T 7/62 |
| 11,450,024 B2* | 9/2022 | Gorodetsky .............. G06T 7/13 |
| 11,506,483 B2* | 11/2022 | Phan ......................... G06T 7/62 |
| 11,562,157 B2* | 1/2023 | Barkan .............. G06K 7/10366 |
| 2004/0027110 A1* | 2/2004 | Sue ........................... G05F 1/40 |
| | | 323/283 |
| 2004/0266335 A1* | 12/2004 | Usui ................ H04W 52/0261 |
| | | 455/3.06 |
| 2006/0182308 A1* | 8/2006 | Gerlach ............. G01N 21/8806 |
| | | 382/100 |
| 2007/0127903 A1* | 6/2007 | Nomura ............. H04N 5/23248 |
| | | 348/E5.046 |
| 2007/0274245 A1* | 11/2007 | Balatsos ............. H04N 19/154 |
| | | 375/E7.088 |
| 2008/0031610 A1* | 2/2008 | Border ............. H04N 5/232123 |
| | | 396/89 |
| 2008/0036904 A1* | 2/2008 | Taneoka ................. H04N 23/65 |
| | | 348/E5.025 |
| 2011/0222757 A1* | 9/2011 | Yeatman, Jr. ........ H04N 13/257 |
| | | 382/154 |
| 2016/0171675 A1* | 6/2016 | Tseng .................... G06F 3/0383 |
| | | 345/8 |
| 2016/0187486 A1* | 6/2016 | Chen ...................... G01S 17/86 |
| | | 702/94 |
| 2016/0212411 A1* | 7/2016 | Lindner .................... G06T 5/50 |
| 2017/0046845 A1* | 2/2017 | Boyle ....................... G06T 7/73 |
| 2017/0169604 A1* | 6/2017 | Van Der Zwan ....... G06T 7/579 |
| 2018/0035099 A1* | 2/2018 | Huang ...................... G06T 7/55 |
| 2018/0180733 A1* | 6/2018 | Smits ........................ G06T 7/70 |
| 2018/0286072 A1* | 10/2018 | Tsai ......................... G06T 7/579 |
| 2019/0080503 A1* | 3/2019 | Bhowmick ............ G06T 15/08 |
| 2019/0132573 A1* | 5/2019 | Shintani .................. G01S 17/08 |
| 2019/0188872 A1* | 6/2019 | Aflalo ..................... G06T 7/337 |
| 2019/0361126 A1* | 11/2019 | Abari ................... H04N 23/698 |
| 2020/0109939 A1* | 4/2020 | Phan ..................... G06T 7/0008 |
| 2020/0121506 A1* | 4/2020 | Iobbi ....................... A61F 9/029 |
| 2020/0193624 A1* | 6/2020 | Rajak ..................... G06T 7/521 |
| 2020/0265600 A1* | 8/2020 | Oh ............................. G06T 7/50 |
| 2020/0302686 A1* | 9/2020 | Totty ......................... G06T 7/12 |
| 2020/0349375 A1* | 11/2020 | Quigley ................ G01J 3/0208 |
| 2020/0364892 A1* | 11/2020 | Ko ........................... G05D 1/12 |
| 2021/0116232 A1* | 4/2021 | Epshteyn ............. G01B 11/002 |
| 2021/0192763 A1* | 6/2021 | Liu ........................ A61B 34/20 |
| 2021/0225020 A1* | 7/2021 | Nonn ........................ G06T 5/50 |
| 2021/0264664 A1* | 8/2021 | Saracchini ....... H04N 5/232939 |
| 2021/0310960 A1* | 10/2021 | Li ........................... G05D 1/0278 |
| 2021/0343035 A1* | 11/2021 | Liyanaarachchi ....... G06T 7/60 |
| 2021/0372771 A1* | 12/2021 | Tilley ....................... G06T 7/62 |
| 2021/0374666 A1* | 12/2021 | Rajak ................. G06Q 10/0875 |
| 2022/0109819 A1* | 4/2022 | Thrimawithana ...... H04N 13/00 |
| 2022/0116544 A1* | 4/2022 | Gamadia ................ H04N 23/90 |
| 2022/0128347 A1* | 4/2022 | Vohinder .............. G01B 11/03 |
| 2022/0270323 A1* | 8/2022 | Meléndez ............. G06V 10/32 |
| 2022/0301192 A1* | 9/2022 | Boardman .............. G06T 17/00 |
| 2023/0112666 A1* | 4/2023 | Thimirachandra .. G01B 21/042 |
| | | 382/103 |
| 2023/0136235 A1* | 5/2023 | Wang .................. B60W 40/105 |
| | | 701/23 |

* cited by examiner

THREE-DIMENSIONAL SENSOR ACUITY RECOVERY ASSISTANCE

BACKGROUND

Stereo imaging assemblies and/or other three-dimensional sensors can be employed, e.g. on mobile computing devices, to dimension objects such as packages, produce three-dimensional representations of scenes and the like. Such three-dimensional sensors may be susceptible to reduced accuracy over time, due to environmental conditions, physical damage and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
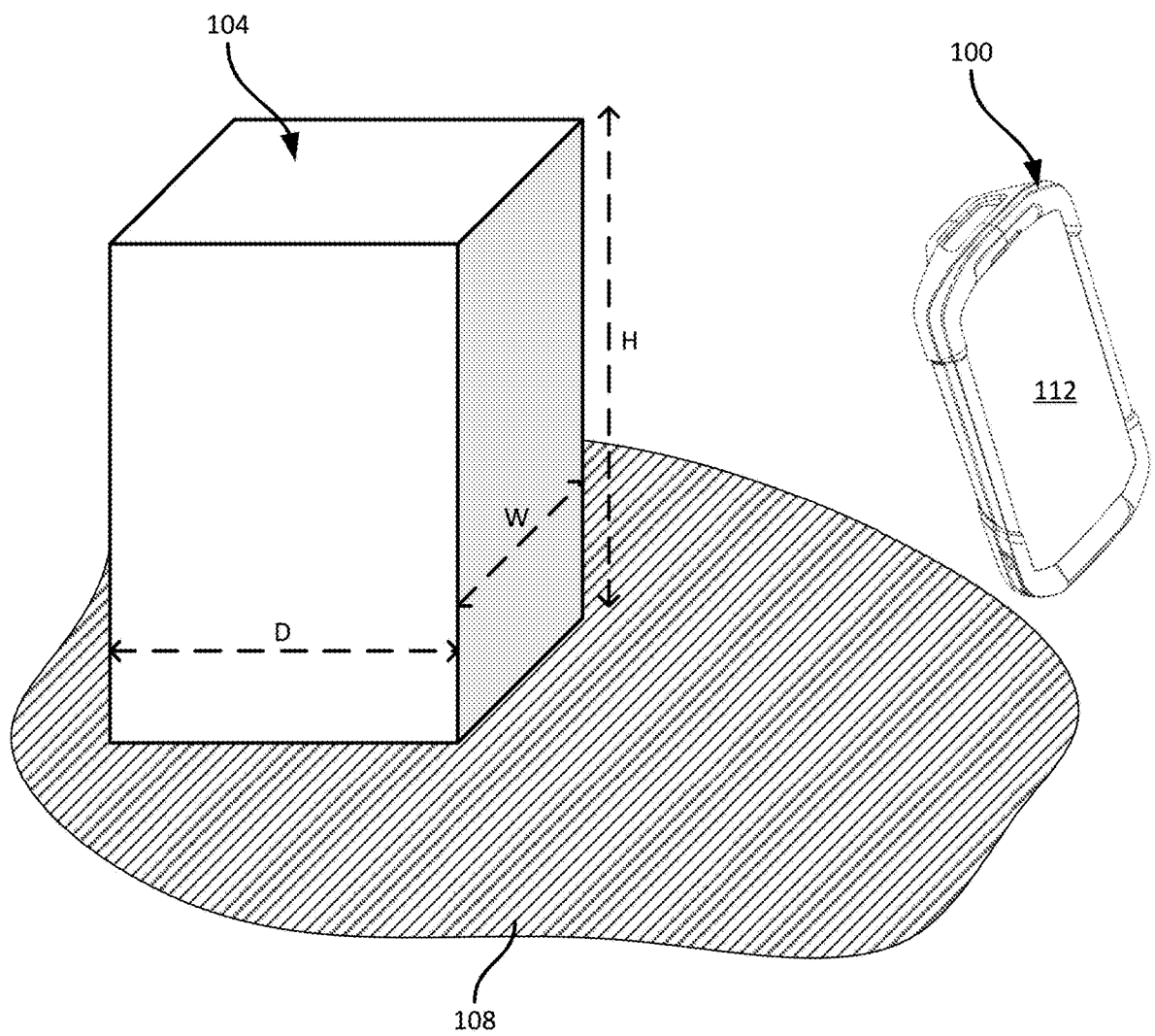
FIG. 1 is a diagram illustrating a mobile computing device to dimension an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device including: a three-dimensional (3D) sensor configured to capture point cloud data from a field of view (FOV); an auxiliary sensor configured to capture reference depth measurements corresponding to a surface within the FOV; a controller connected with the 3D sensor and the auxiliary sensor, the controller configured to: detect a reference depth capture condition; when the reference depth capture condition satisfies a quality criterion, control the auxiliary sensor to capture a reference depth corresponding to the surface within the FOV; and initiate, based on the captured reference depth, generation of corrective data for use at the 3D sensor to capture the point cloud data.

Additional examples disclosed herein are directed to a method, including: detecting a reference depth capture condition; when the reference depth capture condition satisfies a quality criterion, controlling an auxiliary sensor of a computing device to capture a reference depth corresponding to a surface within an FOV of a three-dimensional (3D) sensor of the computing device; and initiating, based on the captured reference depth, generation of corrective data for use at the 3D sensor to capture point cloud data.

FIG. 1 illustrates a mobile computing device 100 (also referred to herein as the mobile device 100 or simply the device 100) that is enabled to capture point cloud data using a three-dimensional (3D) sensor, such as a stereo camera assembly, time-of-flight (Tof) camera, lidar sensor, or the like. The point cloud data can be employed for a wide variety of purposes, including generation of three-dimensional representations of scenes and/or detection of objects within such scenes. The point cloud data, in the present example, enables the device 100 to detect objects such as an object 104 illustrated in FIG. 1. The object 104 can be a package or collection of packages (e.g. on a pallet) in a transport and logistics facility, for example.

The device 100 can also detect, from the above-mentioned point cloud data, a reference surface such as a floor 108 upon which the object 104 rests. The device 100 may then determine characteristics of the object 104, such as dimensions including a height "H", a width "W" and a depth "D" of the object 104. The dimensions generated by the device 100 can be employed to generate a bounding box encompassing the object 104, for use by other computing devices associated with the device 100 (e.g. to optimize the use of space in a container used to ship the object 104, to determine a shipping cost for the object 104, and the like). The device 100 can present the dimensions, as well as a variety of other information, on a display 112.

Figure 2:
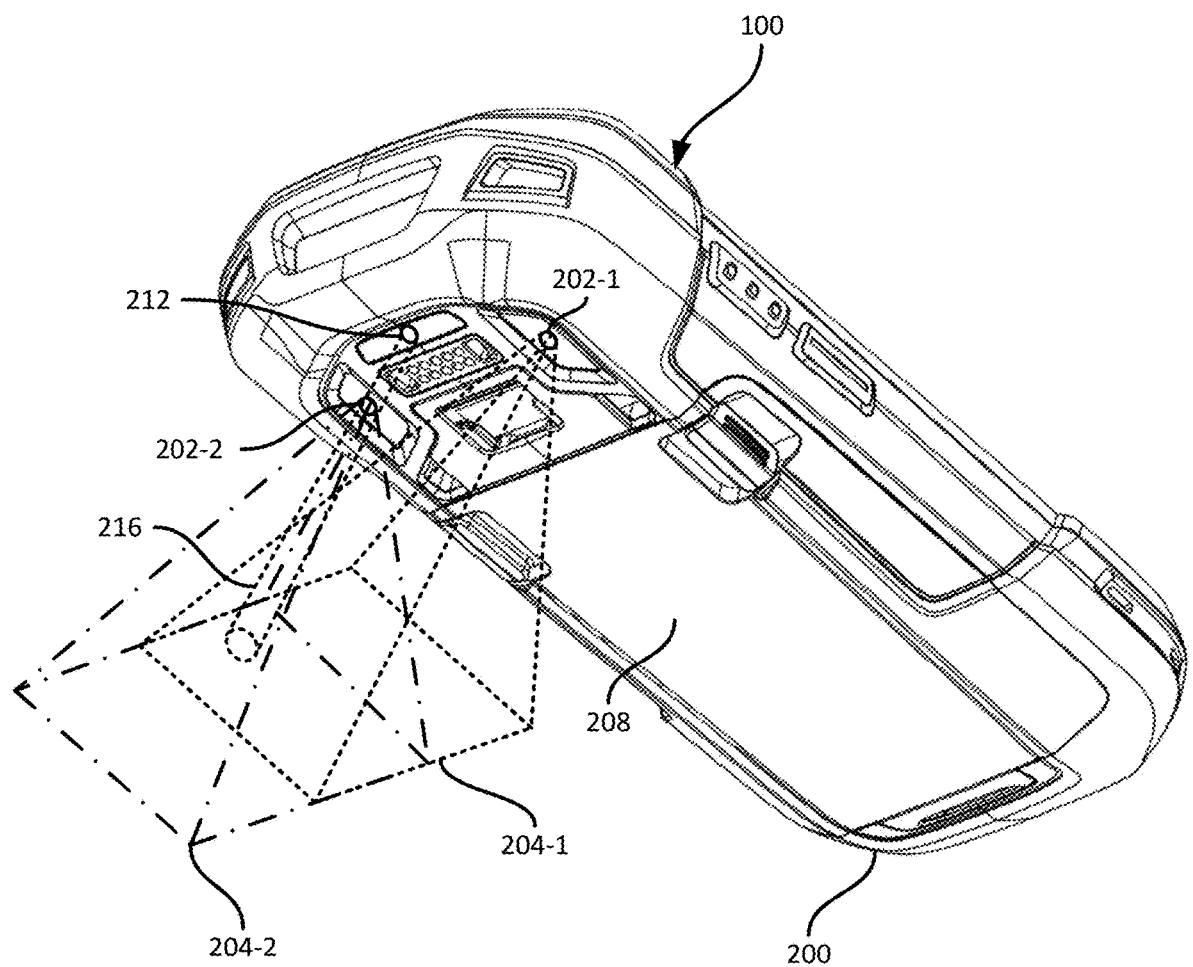
FIG. 2 is a diagram illustrating a rear view of the mobile computing device of FIG. 1.

Turning to FIG. 2, the device 100 is shown from the rear (opposite the side bearing the display 112). As shown in FIG. 2, the device 100 includes a housing 200 supporting the various components of the device 100. Among the components supported by the housing 200 are the display 112 shown in FIG. 1, which may include an integrated touch screen. The device 100 can also include other input and/or output components, in addition to or instead of the display 112 and touch screen mentioned above. Examples of such components include speakers, microphones, keypads, and the like.

In the present example, the 3D sensor of the device 100 is implemented as a stereo camera assembly having a first camera 202-1 and a second camera 202-2, spaced apart from each other on the housing 200 of the device 100. The cameras 202 each include a suitable image sensor or combination of image sensors, optical components (e.g. lenses) and the like. The cameras 202 have respective fields of view (FOV) 204-1 and 204-2 extending away from a back surface 208 of the device 100. The FOVs 204, in the illustrated example, are substantially perpendicular to the back surface 208.

The FOVs 204 overlap, as illustrated in FIG. 2, enabling the device 100 to capture point cloud data for objects within the FOVs 204 and determine information such as the dimensions mentioned earlier for such objects. The degree of overlap shown in FIG. 2 is purely for illustrative purposes. In other examples, the FOVs 204 may overlap to a greater or smaller degree than illustrated. The FOVs 204 may be referred to together as a field of view of the stereo camera assembly, although it will be understood that such a field of view results from the combination of the two FOVs 204.

The device 100 may also include an additional camera or other image sensor to capture images. In some examples, the cameras 202 may also be controllable independently to capture two-dimensional images that need not be processed to yield point cloud data.

The point cloud data captured by the stereo camera assembly of the device 100 may suffer from reduced accuracy over time, for example due to shifting of optical components or the like. Environmental factors such as impacts from drops, extreme temperatures, and the like may cause of accelerate such degraded performance. In order to maintain or restore accurate generation of point cloud data, the stereo camera assembly may be configured to perform a corrective process to generate corrective data that can be applied to images from the cameras 202 prior to generating point cloud data therefrom. The corrective data can include adjustments to be applied to calibrated offset distances between the cameras 202, and the like. The corrective processes may also be referred to as acuity recovery processes. As least one of such acuity recovery processes can enable the device 100 to maintain or restore accurate depth perception by the stereo camera assembly.

The generation of the above-mentioned corrective data may involve obtaining ground truth information against which the adjustments can be determined. In the context of acuity recovery for depth perception, the ground truth information includes a known distance from the cameras 202 to a reference surface, such as the floor 108 shown in FIG. 1. In the discussion below, such ground truth information is referred to as a reference depth measurement, or simply a reference depth. The reference depth is obtained independently of the stereo cameras 202 themselves, and is employed as an input to the corrective process To that end, the device 100 also includes an auxiliary sensor 212 on the back surface 208 thereof. The auxiliary sensor 212 enables the device 100 to determine a reference depth between the device 100 itself and a reference surface, such as the floor 108. As seen in FIG. 2, the auxiliary sensor 212 has a field of view 216 that overlaps with the FOVs 204 of the stereo cameras 202. As a result, the auxiliary sensor 212 can capture a reference depth that corresponds to a surface also visible to the stereo camera assembly.

In the present example, the auxiliary sensor is a range finder, such as an infrared or near-infrared laser-based range finder. Various other auxiliary sensors are also contemplated however, including ultrasonic sensors, time-of-flight sensors, and the like. As will be apparent to those skilled in the art, successful recovery or maintenance of depth acuity of the stereo camera assembly is dependent on the accuracy of the reference depth. Further, the accuracy of depth measurements captured by the auxiliary sensor 212 may vary based on a number of conditions, including surface characteristics of the reference surface (e.g. color, reflectance and the like), orientation of the auxiliary sensor 212 relative to the surface, and the like.

The corrective processes themselves may also be subject to certain constraints to successfully recover or maintain point cloud capture accuracy. Examples of such constraints can include remaining substantially stationary for a period of time (e.g. ten seconds, although the period of time may be shorter or longer for various types of devices and corrective processes), and maintaining a given orientation relative to the reference surface during the above period of time. Such constraints may enable the capture of a sufficient volume of image data consistently depicting the reference surface by the cameras 202, to which the reference depth can be compared to determine corrective data for use in generate subsequent point clouds.

The device 100 therefore, as will be discussed below in greater detail, performs certain functions to determine when to initiate corrective processes, and to assist in maintaining the above constraints and obtaining sufficiently accurate reference depth measurements for use in the corrective processes.

Before further discussing the functionality implemented by the device 100, certain components of the device 100 will be described, with reference to FIG. 3.

Figure 3:
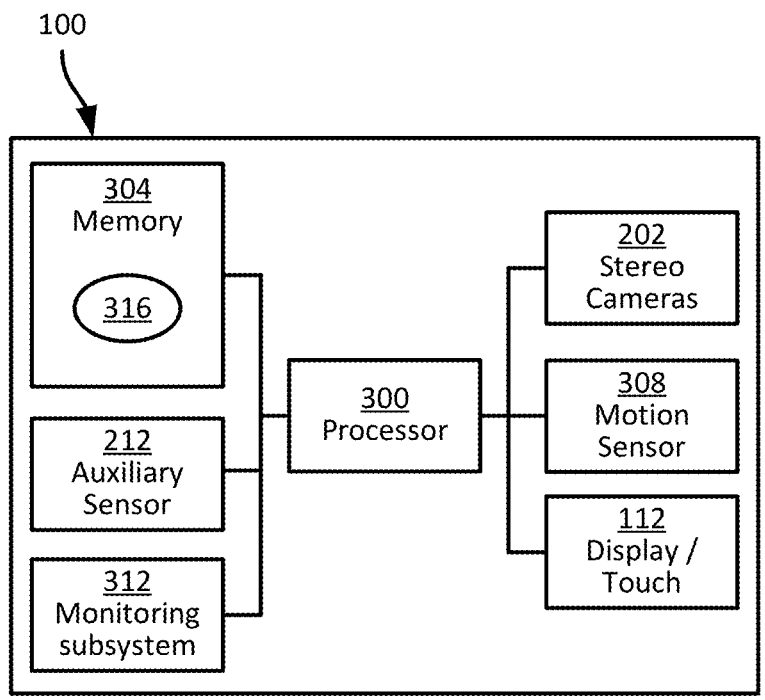
FIG. 3 is a block diagram of certain internal hardware components of the mobile computing device of FIG. 1.

Referring to FIG. 3, a block diagram of certain components of the device 100 is illustrated. In addition to the display (and integrated touch screen, in this example) 112, cameras 202, and auxiliary sensor 212, the device 100 includes a special-purpose controller, such as a processor 300, interconnected with a non-transitory computer readable storage medium, such as a memory 304. The memory 304 includes a combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits.

The device 100 also includes a motion sensor 308, such as an inertial measurement unit (IMU) including a suitable combination of gyroscopes, accelerometers and the like. The motion sensor 308 is configured to provide measurements to the processor 300 defining motion and/or orientation of the device 100. For example, the motion sensor 308 can provide a gravity vector indicating at least the orientation of the device 100 relative to the vertical direction (i.e. towards the center of the planet). Alternatively, the processor 300 can generate the gravity vector from data received from the motion sensor 308.

The device 100 can also include a monitoring subsystem 312 that includes one or more monitoring sensors configured to capture measurements indicative of environmental conditions (e.g. temperature, humidity and the like) and/or to detect events such as drops or other shocks suffered by the device 100. For example, the monitoring subsystem 312 can include a temperature sensor, and at least one motion sensor such as an IMU. In some examples, the sensors of the monitoring subsystem 312 are low-power sensors and the monitoring subsystem 312 also includes a backup power source such as an auxiliary battery distinct from a primary battery or other power source of the device 100, a super capacitor, or the like. In other examples, such a backup power source can be omitted and the monitoring subsystem can be powered by a primary battery that also powers the remaining components of the device 100.

The memory 304 stores computer readable instructions for execution by the processor 300. In particular, the memory 304 stores a 3D acuity recovery application 316, also referred to herein simply as the application 316. The application 316, when executed by the processor 300, configures the processor 300 to control the cameras 202, the auxiliary sensor 212, and the monitoring subsystem 312, to gather data for use in executing a corrective process for point cloud generation.

The processor 300, when so configured by the execution of the application 316, may also be referred to as a controller. Those skilled in the art will appreciate that the functionality implemented by the processor 300 via the execution of the application 316 may also be implemented by one or more specially designed hardware and firmware components, such as FPGAs, ASICs and the like in other embodiments. In some examples, at least some of the functionality described below can be performed by a distinct controller integrated with the cameras 202.

Figure 4:
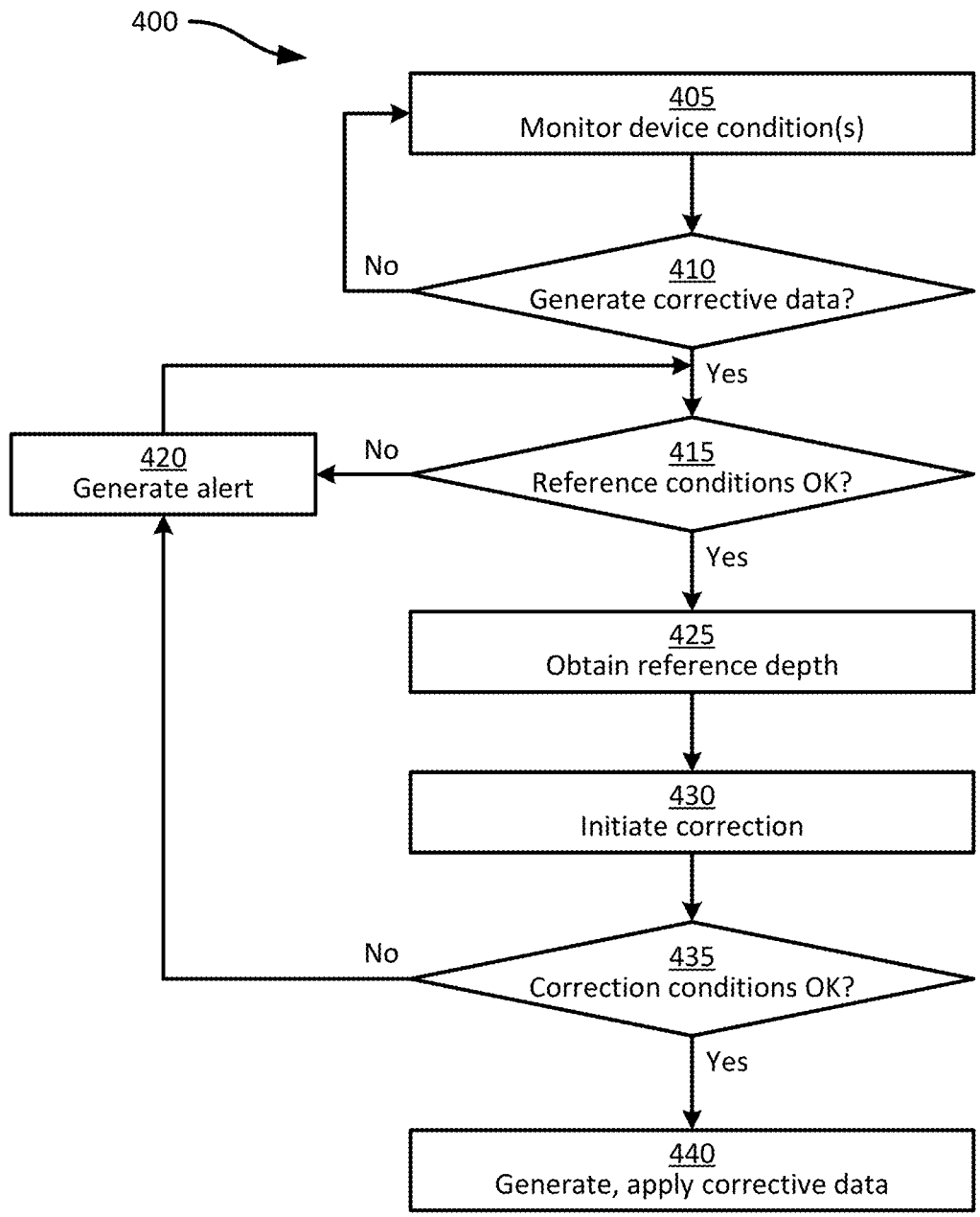
FIG. 4 is a flowchart of a method of initiating and assisting a 3D acuity recovery process.

Turning now to FIG. 4, the functionality implemented by the device 100 will be discussed in greater detail. FIG. 4 illustrates a method 400 for initiating and assisting a 3D acuity recovery process. The method 400 will be discussed below in conjunction with its performance by the device 100.

At block 405, the processor 300 is configured to monitor at least one device condition and determine whether the device condition indicates an excursion that may lead to reduced 3D capture accuracy. The device 100 is configured to monitor device conditions using the monitoring subsystem 312. The sensors of the monitoring subsystem 312, for example, can log events for the processor 300 to inspect in order to determine whether to initiate a corrective process. For example, the monitoring subsystem 312 can store a log event indicating when an ambient temperature exceeded a threshold (e.g. an upper threshold indicating excessive heat, or a lower threshold indicating excessive cold). In other examples, the monitoring subsystem 312 can log events indicating the occurrence of shocks detected by an IMU that exceed a predefined magnitude, vibrations that exceed a predetermined magnitude or length, and the like.

The monitoring subsystem 312 may also be configured to log power loss events, such as the loss of power to the sensors of the monitoring subsystem 312 due to exhaustion of the backup power source mentioned above. The monitoring subsystem 312 may also log a power loss event in implementations lacking backup power sources, e.g. when the device 100 is powered off and a charging cable is unplugged. Power loss events indicate that the monitoring subsystem 312 was unable to consistently monitor the device conditions, and therefore cannot provide assurance to the operator of the device 100 that no excursions occurred. For example, the device 100 may have been dropped after the power loss, but such a drop may not have been detected by the monitoring subsystem 312 due to the power loss.

Other device conditions may also be monitored at block 405. For example, the device 100 can monitor a predetermined time period after which a corrective process may be performed even if no other excursions are detected. The monitoring subsystem 312 may log an event indicating that the time period (e.g. one month, although longer and shorter time periods may also be employed) has elapsed, for example.

At block 410, the device 100 is configured to determine, based at least in part on the results of the monitoring at block 405, whether to initiate a corrective process to generate corrective data for use in generating point clouds with the cameras 202. The determination at block 410 can include a determination of whether the log maintained by the monitoring subsystem 312, as mentioned above, contains any excursion events.

Figure 5:
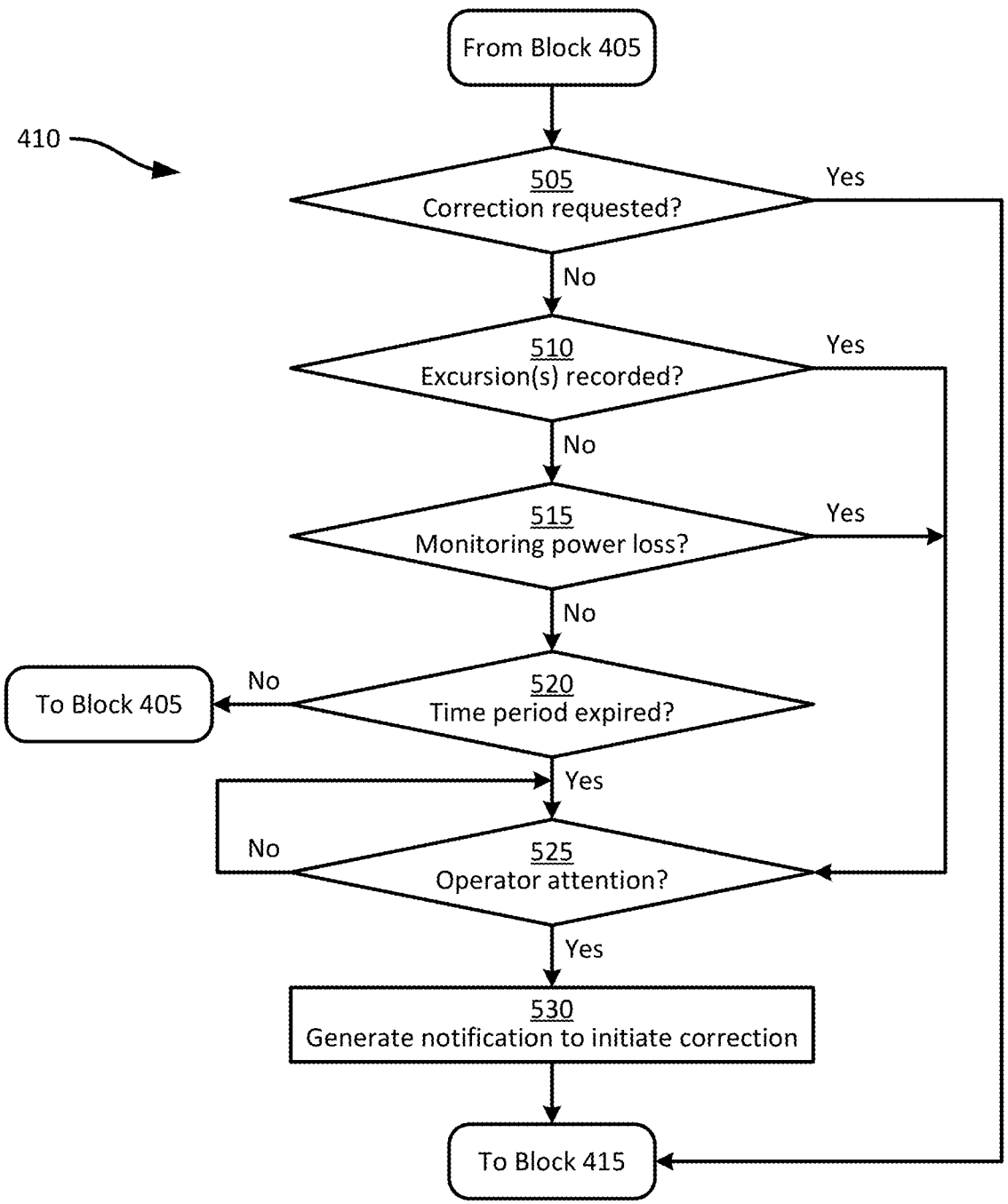
FIG. 5 is a flowchart of a method of performing block 410 of the method of FIG. 4.

Turning to FIG. 5, a method of performing block 410 in some implementations is shown. In particular, at block 505 the device 100 determines whether a corrective process has been explicitly requested, e.g. by an operator of the device 100. For example, the operator may manipulate the touch screen mentioned above, or any other input device, to generate a command to initiate a corrective process. In such examples, the log maintained by the monitoring subsystem 312 need not be consulted, and performance of the method 400 proceeds directly to block 415.

When the determination at block 505 is negative, the device 100 determines, at block 510, whether the log maintained by the monitoring subsystem 312 contains an excursion events. Such events include shocks exceeding a threshold amplitude, temperatures exceeding hot or cold thresholds, and the like (as described above). When an excursion event is present in the log, the device 100 proceeds to block 525, discussed below. When the determination at block 510 is negative, however, the device 100 proceeds to block 515.

At block 515 the device 100 determines whether the log maintained by the monitoring subsystem 312 indicates that the monitoring subsystem 312 has lost power. The determination at block 515 can also be a determination of whether a connector or charger has been disconnected from the device 100 while the device 100 is powered off. When the determination at block 515 is affirmative, the device 100 proceeds to block 525. When the determination at block 515 is negative, the device proceeds instead to block 520.

At block 520, the device 100 is configured to determine whether the above-mentioned time period has elapsed since the previous corrective process. When the determination at block 520 is negative, the device 100 returns to block 405, having determine that there is currently no need to run the 3D corrective process. When the determination at block 520 is affirmative, however, the device 100 proceeds to block 525.

At block 525, following affirmative determinations at block 510, 515 or 525, the device 100 can determine whether any of a variety of conditions is satisfied indicating that the attention of an operator is directed to the device 100. For example, the device 100 can determine whether a dimensioning operation has been initiated by the operator within a time period (e.g. the previous 5 seconds), indicating that the operator is likely to be looking at the display 112. In other examples, the determination at block 525 can include whether the operator has recently logged into an account on the device 100, or the like. In other examples, block 525 can be omitted.

At block 530, following an affirmative determination at block 525, the device 100 is configured to generate a notification (e.g. visual, audible, or both) to prompt the operator of the device 100 to initiate a corrective process. As will be apparent, when the determination at block 525 is negative, the device 100 may wait (repeating the performance of block 525) until an affirmative determination at block 525 before performing block 530. Following the performance of block 530, the device 100 proceeds to block 415 of the method 400. In some examples, the device 100 may await an operator command to proceed with the corrective process before proceeding to block 415.

As noted earlier, before generating corrective data for use in processing data captured by the 3D sensor to generate point clouds, ground truth information such as a reference depth is obtained by the device 100. To mitigate against various factors that can negatively affect the accuracy of reference depth measurements, at block 415 the device 100 is configured to detect at least one reference depth capture condition and determine whether the reference depth capture condition(s) satisfy at least one quality criterion. The quality criteria, in general, are selected such that when the capture conditions satisfy the quality criteria, captured reference depth measurements are likely to be sufficiently accurate for use in the 3D acuity corrective process.

The reference depth capture conditions include, for example, an orientation of the device 100. For example, the accuracy of the auxiliary sensor 212 may be reduced when the field of view 216 is not substantially orthogonal to the surface from which the depth measurement is captured. Therefore, the device 100 can be configured to obtain a device orientation from the motion sensor 308 and compare the orientation to a predetermined target orientation or range of target orientations.

Figure 6:
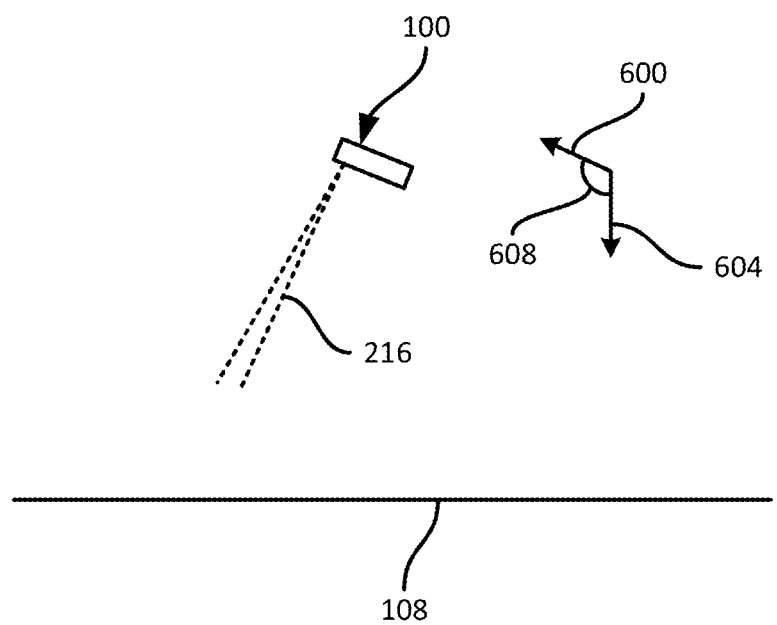
FIG. 6 is a diagram illustrating a performance of block 415 of the method of FIG. 4.

For example, turning to FIG. 6, the device 100 is shown from the side, with the field of view 216 pointed towards the floor 108. An orientation 600 of the device 100 is also illustrated, along with a gravity vector 604. The device 100 can be configured, at block 415, to determine whether the angle 608 between the orientation 600 and the vector 604 is within a threshold (e.g. 5 degrees) or orthogonal (i.e. 85 to 95 degrees). In other embodiments, the target orientation and thresholds may vary depending on the nature of the auxiliary sensor 212 and the placement of the auxiliary sensor 212 on the device 100.

Returning to FIG. 4, other capture conditions that can be evaluated at block 415 include a raw depth measurement obtained via the auxiliary sensor 212. For example, the device 100 can enable the auxiliary sensor 212 and obtain one or more depth measurements therefrom. The depth measurements may then be compared to one or more thresholds, such as an upper threshold and a lower threshold defining a range of depths in which the auxiliary sensor 212 has sufficient accuracy for use in the generation of corrective data.

Other example capture conditions evaluated at block 415 can include surface characteristics of the floor 108, such as the color of the floor 108, reflectance of the floor 108, and the like. To detect such conditions, the device 100 can operate one or both of the cameras 202, or another sensor (e.g. an auxiliary camera), to capture an image of the floor 108. The device 100 can process the image to detect surface color, reflectance and the other suitable surface properties. The determination at block 415 can therefore include whether such surface characteristics fall within predetermined ranges. For example, the auxiliary sensor 212 may perform poorly on dark-colored surfaces, and the determination at block 415 may therefore include determining whether the floor 108 has at least a minimum luminosity, brightness or the like.

Other surface characteristics may also be assessed at block 415. For example, an image captured by one of the cameras 202 (or another suitable sensor of the device 100) can be processed to identify and segment objects therein and/or characterize surfaces in the image. The device 100 can therefore be configured to determine at block 415 whether the portion of the floor 108 (or any other reference surface) towards which the auxiliary sensor 212 and the cameras 202 are faced is sufficiently flat and clear of obstructions such as boxes, the feet of the operator of the device 100, and the like.

Further conditions evaluated at block 415 can include a stability condition. For example, the device 100 can obtain, via the motion sensor 308, an indication of a magnitude of jitter currently experienced by the device 100. The quality criterion for such a condition may be a maximum allowable magnitude of jitter. Various other capture conditions will also occur to those skilled in the art, including environmental conditions such as temperature, humidity and the like. Quality criteria corresponding to such conditions (e.g. temperature thresholds) will also occur to those skilled in the art.

During the performance of block 415, the device 100 can generate feedback for the operator of the device, e.g. via the display 112, a speaker, and/or other output devices. The feedback can represent a current state of one or more of the capture conditions. For example, the display 112 can be controlled to present a current distance from the device 100 to the floor 108 along with a target range of distances. Other examples of feedback presented to the operator can include an indication of the current orientation of the device 100 (e.g. one or more angles relative to the floor 108), an indication of a current level of jitter detected by the device 100 along with a maximum permissible level of jitter, and the like. In other words, the device 100 can present both a current state of a capture condition, and the quality criterion associated with the capture condition.

When the determination at block 415 is negative, indicating that the capture conditions do not satisfy the quality criteria, the device 100 proceeds to block 420. At block 420 the device 100 is configured to generate an alert, e.g. via the display 112, a speaker, or combination thereof, indicating to the operator of the device 100 that capture conditions are not amenable to obtaining a sufficiently accurate reference depth. The alert generated at block 420 can include guidance, such as an instruction to place the device 100 parallel to the floor 108 if the quality criterion that led to a negative determination at block 415 was the above-mentioned set of angular thresholds. The display 112 can also be controlled to present a current view of the floor (e.g. acting as a viewfinder), e.g. by capturing a stream of images with one of the cameras 202 or another camera of the device 100. The floor 108 may, in some examples, bear a marking indicating a boundary at which the operator is instructed to point the device 100 during performance of the method 400. In further examples, the device 100 may present, on the display 112 along with the above-mentioned stream of images, an overlay indicating the extent of the FOVs 204 and/or 216 that are employed by the corrective processes, to assist the operator in maintaining such extent free of obstacles (such as the feet of the operator, as mentioned earlier).

Following block 420, the device 100 returns to block 415 to continue monitoring capture conditions. When the determination at block 415 is affirmative, the device 100 proceeds to block 425. At block 425, the device 100 obtains a reference depth measurement from the auxiliary sensor 212.

Obtaining the reference depth at block 425 can include simply using the first reference depth measurement generated after an affirmative determination at block 415. In some examples, however, obtaining the reference depth can include applying additional processing.

The processing applied at block 425 to obtain a reference depth can include collecting multiple depth measurements and generating an aggregated reference depth from those measurements. For example, the device 100 can control the auxiliary sensor 212 to collect a set of depth measurements over a period of time (e.g. ten samples over a one-second period, although a wide variety of other sampling rates may also be employed, depending on the auxiliary sensor 212). The auxiliary sensor 212 may have a given variance associated with measurements generated by the sensor 212 (i.e. a level of precision). By collecting a number of measurements, the processor 300 may therefore filter and/or combine the measurements (e.g. by averaging the set of measurements) to obtain a combined measurement that reduces the above variance.

In other examples, one or more adjustments can be applied to the depth measurement obtained at block 425. For example, the memory 304 may store characterization data defining adjustment factors for the auxiliary sensor 212 that correspond to various surface characteristics and/or other capture conditions. The characterization data, in other words, may specify a given adjustment to be applied to depth measurements when such measurements are captured using a dark-colored surface, or the like. The adjustments can be determined empirically prior to deployment of the device 100.

Figure 7:
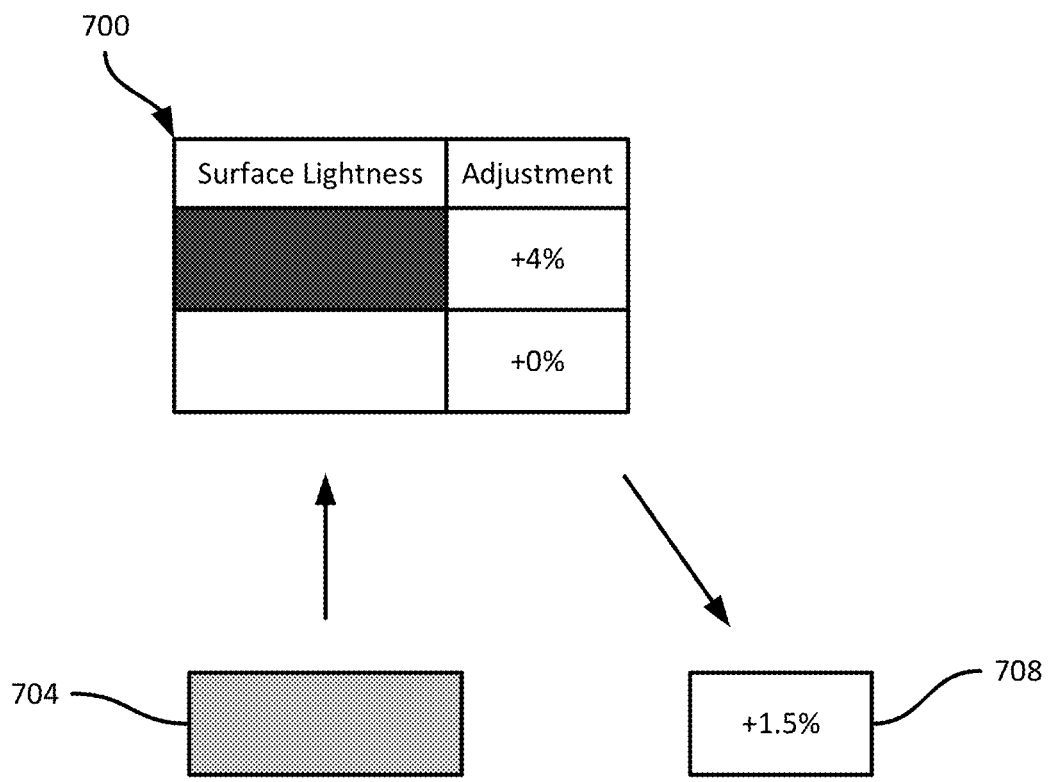
FIG. 7 is a diagram illustrating another performance of block 425 of the method of FIG. 4.

Turning to FIG. 7, an example of the above-mentioned characterization data is shown. In particular, characterization data 700 is shown as defining adjustments for two surface lightnesses, such that depth measurements for dark-colored surfaces are increased by 4%, while depth measurements for light-colored surfaces are not adjusted. The specific adjustments shown in FIG. 7 are solely for illustrative purposes. Other magnitudes of adjustments, both positive and negative, may also be employed. Further, adjustments need not be percentage-based, but can be absolute adjustments (e.g. a number of millimeters), a combination of relative and absolute adjustments, and the like.

The characterization data 700 can be stored as a look-up table or the like in the memory 304, for retrieval at block 425. Having determined a lightness 704 of the floor 108, the processor 300 can be configured to generate an adjustment based on the characterization data 700, e.g. by interpolating an adjustment 708 from the data 700. Thus, a greater number of adjustments can be applied than those explicitly stored in the data 700. Similar adjustments can be selected from other characterization data corresponding to other features, such as surface reflectance, temperature, and the like.

Returning to FIG. 4, in response to obtaining the reference depth at block 425, the device 100 initiates the corrective process with the stereo cameras 202 at block 430. The corrective process includes capturing a stream of images via the cameras 202 for a period of time (e.g. two to ten seconds) and processing the images alongside the reference depth to determine corrective data for application to subsequent point cloud capture.

At block 435, during the data capture phase of the corrective process initiated at block 430, the device 100 monitors correction capture conditions and determines whether the capture conditions satisfy respective quality criteria. The capture conditions and quality criteria assessed at block 435 can include those described above in connection with block 415. For example, the device 100 can be configured to determine whether a degree of jitter or other motion experienced by the device 100 is smaller than a predetermined threshold, indicating that the device 100 is substantially stationary. The device 100 may also monitor device orientation, e.g. to verify that the FOVs 204 and 216 remain substantially orthogonal to the floor 108 during the data capture phase of the corrective process.

If the determination at block 435 is negative, the device 100 proceeds to block 420 to generate an alert as discussed above. The method 400 may then resume at block 415. That is, if capture conditions are not satisfied at block 435, it may be necessary to capture a new reference depth because the failure to satisfy capture conditions at block 435 may indicate that the device 100 has moved such that the reference depth from block 425 no longer accurately represents the position of the device 100 relative to the floor 108.

When the determination at block 435 is affirmative (i.e. when the capture conditions satisfy quality criteria throughout the data capture phase of the corrective process), the device 100 proceeds to block 440. At block 440, the device 100 generates the above-mentioned corrective data, for storage and application to future images captured by the cameras 202 in order to generate point clouds. The corrective data can include, as noted earlier, applied to calibrated offset distances between the cameras 202 and the like. Various mechanisms employed to derive the corrective data will be apparent to those skilled in the art, and are not discussed in detail herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
a three-dimensional (3D) sensor configured to capture point cloud data from a field of view (FOV);
an auxiliary sensor configured to capture reference depth measurements corresponding to a surface within the FOV;
a motion sensor;
a controller connected with the 3D sensor and the auxiliary sensor, the controller configured to:
detect a reference depth capture condition;
when the reference depth capture condition satisfies a quality criterion, wherein the quality criterion includes a target orientation:
(a) control the auxiliary sensor to capture a reference depth corresponding to the surface within the FOV, and
(b) initiate, based on the captured reference depth, generation of corrective data for use at the 3D sensor to capture the point cloud data;
wherein:
the controller, in order to detect the reference depth capture condition, obtains a device orientation from the motion sensor.

2. The computing device of claim 1, wherein the 3D sensor includes a stereo camera; and wherein the auxiliary sensor includes a range finder.

3. The computing device of claim 1, wherein the auxiliary sensor has a field of view overlapping with the FOV of the 3D sensor.

4. The computing device of claim 1, wherein the target orientation places an FOV of the auxiliary sensor substantially orthogonal to the surface.

5. The computing device of claim 1, wherein the reference depth capture condition includes an initial depth measurement; and wherein the quality criterion includes upper and lower depth thresholds.

6. The computing device of claim 1, wherein the controller is further configured to:
detect a characteristic of the surface; and
apply an adjustment to the reference depth prior to initiation of the corrective data generation, based on the detected surface characteristic.

7. The computing device of claim 6, wherein the surface characteristic includes at least one of color and reflectance.

8. The computing device of claim 1, wherein the controller is further configured, prior to detection of the reference depth capture condition, to:
monitor a device condition; and
determine that the device condition indicates an excursion.

9. The computing device of claim 8, wherein the device condition includes at least one of an indication of device motion, power status, and temperature.

10. The computing device of claim 1, wherein the controller is further configured, responsive to initiating generation of the corrective data, to monitor a device condition and interrupt the generation of corrective data if the device condition indicates an excursion.

11. A method, comprising:
detecting a reference depth capture condition, detecting the reference capture condition includes obtaining a device orientation from a motion sensor of a computing device;
when the reference depth capture condition satisfies a quality criterion, wherein the quality criterion includes a target orientation:
(a) controlling an auxiliary sensor of the computing device to capture a reference depth corresponding to a surface within an FOV of a three-dimensional (3D) sensor of the computing device, and
(b) initiating, based on the captured reference depth, generation of corrective data for use at the 3D sensor to capture point cloud data; and
when the reference depth capture condition does not satisfy the quality criterion, detecting a new reference depth capture condition.

12. The method of claim 11, wherein the 3D sensor includes a stereo camera; and wherein the auxiliary sensor includes a range finder.

13. The method of claim 11, wherein the auxiliary sensor has a field of view overlapping with the FOV of the 3D sensor.

14. The method of claim 11, wherein the target orientation places an FOV of the auxiliary sensor substantially orthogonal to the surface.

15. The method of claim 11, wherein the reference depth capture condition includes an initial depth measurement; and wherein the quality criterion includes upper and lower depth thresholds.

16. The method of claim 11, further comprising:
detecting, before initiating generation of corrective data for use at the 3D sensor to capture point cloud data, a characteristic of the surface; and
applying an adjustment to the reference depth prior to initiation of the corrective data generation, based on the detected surface characteristic.

17. The method of claim 16, wherein the surface characteristic includes at least one of color and reflectance.

18. The method of claim 11, further comprising, prior to detection of the reference depth capture condition:
   monitoring a device condition; and
   determining that the device condition indicates an excursion.

19. The method of claim 18, wherein the device condition includes at least one of an indication of device motion, power status, and temperature.

20. The method of claim 11, further comprising, responsive to initiating generation of the corrective data: monitoring a device condition and interrupting the generation of corrective data if the device condition indicates an excursion.

21. The method of claim 11, further comprising:
   controlling, after detecting a reference depth capture condition, an output device to present operator feedback associated with the detected reference depth capture condition.

* * * * *